United States Patent
Lucchese

(10) Patent No.: US 9,217,246 B2
(45) Date of Patent: Dec. 22, 2015

(54) SURFACE COVERING FOUNDATION

(75) Inventor: Claudio Lucchese, Maranello (IT)

(73) Assignee: FLORIM CERAMICHE S.P.A., Fiorano Modenese (MO) (IT)

( * ) Notice: Subject to any disclaimer, the term of this patent is extended or adjusted under 35 U.S.C. 154(b) by 108 days.

(21) Appl. No.: 14/124,188

(22) PCT Filed: Jun. 21, 2012

(86) PCT No.: PCT/IB2012/053136
§ 371 (c)(1),
(2), (4) Date: Dec. 5, 2013

(87) PCT Pub. No.: WO2012/176146
PCT Pub. Date: Dec. 27, 2012

(65) Prior Publication Data
US 2014/0093670 A1      Apr. 3, 2014

(30) Foreign Application Priority Data
Jun. 21, 2011    (IT) .............. MO2011A0156

(51) Int. Cl.
| B32B 3/06 | (2006.01) |
| E04B 1/90 | (2006.01) |
| E04B 1/76 | (2006.01) |
| E04B 1/86 | (2006.01) |
| B32B 3/08 | (2006.01) |

(52) U.S. Cl.
CPC ... *E04B 1/90* (2013.01); *B32B 3/06* (2013.01); *B32B 3/08* (2013.01); *E04B 1/767* (2013.01); *E04B 1/86* (2013.01); *B32B 2419/04* (2013.01); *B32B 2607/00* (2013.01); *Y10T 428/192* (2015.01)

(58) Field of Classification Search
CPC ... E04F 15/02138; E04F 15/18; E04F 15/181; E04F 15/187; E04F 15/203; E04F 15/02144; E04F 2201/08
USPC ................................................ 428/58, 60, 99
See application file for complete search history.

(56) References Cited

U.S. PATENT DOCUMENTS

| 2004/0018354 | A1 | 1/2004 | May | |
| 2010/0236180 | A1* | 9/2010 | Pacione et al. | 52/578 |

FOREIGN PATENT DOCUMENTS

| DE | 29908056 | 7/1999 |
| EP | 0436498 | 7/1991 |
| EP | 1013847 | 6/2000 |

* cited by examiner

*Primary Examiner* — Alexander Thomas
(74) *Attorney, Agent, or Firm* — Themis Law

(57) ABSTRACT

A surface covering foundation includes a first covering element having a thickness and defining a first juxtaposition side; a second covering element having a thickness substantially equal to that of the first element and defining a second juxtaposition side, adapted to be juxtaposed with the first side, the first element having a lip that forms an outward extension of the first juxtaposition side and is adapted to overlap the second juxtaposition side in a juxtaposed configuration of the first and the second covering elements.

4 Claims, 1 Drawing Sheet

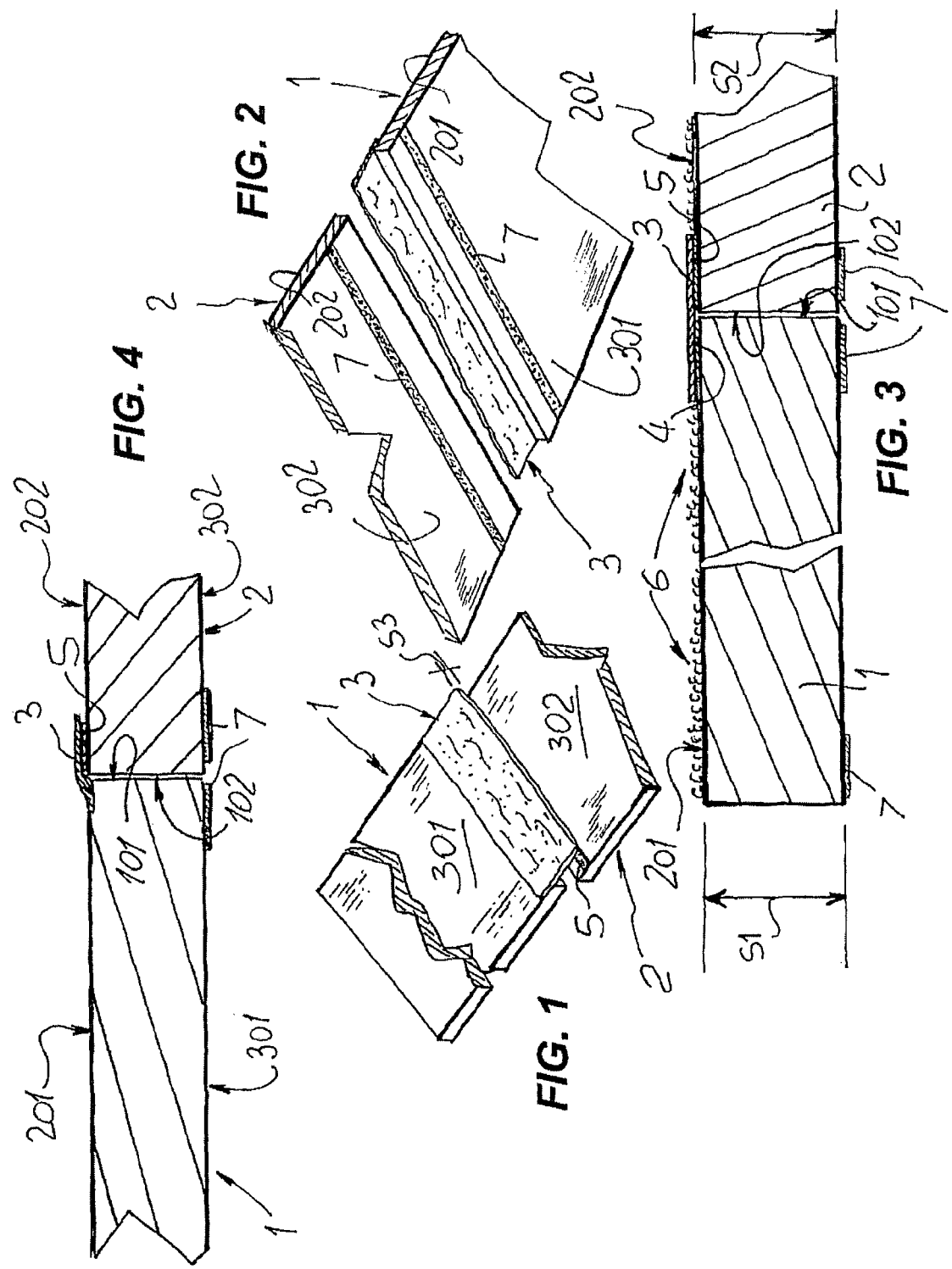

SURFACE COVERING FOUNDATION

FIELD OF THE INVENTION

The invention relates to a surface covering foundation, particularly for covering surfaces that are designed to form floors or walls with finishing products such as ceramic tiles or slabs, possibly in removable fashion and maintaining continuity of the foundation.

STATE OF THE ART

The provision of heat and sound insulating foundations, when constructing floors and walls of buildings has been long known.

These foundations are generally made of sheathing sheets or webs of special materials, which are laid in side-by-side relation to cover an entire surface to be insulated, and are adapted to subsequently receive covering products thereon, such as ceramic tiles and slabs or wooden slats or strips, to form a final walkable surface or a water repellent or sound-insulating wall, or to form a protective barrier against thermal stresses that tend to increase or decrease temperatures in building rooms, and thus reduce energy requirements for cooling and heating them.

Typically, these foundations are directly laid on the concrete base course, when making floors and on rough walls when making lateral walls.

The finishing products are later laid on these foundations, to impart a finished and pleasant look to the building rooms.

The foundations are typically formed with flexible materials packaged in rolls, that are designed to be unrolled to cover a strip of the entire surface, or in sheets.

The entire surface shall be covered by laying strips or sheets in juxtaposed relation, and also fixing them to the surfaces upon which they are laid, with glue materials or double-sided adhesive tapes being used for fixation step.

Furthermore, great care should be taken at the juxtaposition areas of the strips or sheets, to prevent the formation of open slits between contact edges, and hence the infiltration of moisture from rough surfaces to the finishing materials, which would generate molds or stains that would spoil the finished walls and floors, and make the latter unhealthy.

Therefore, when foundations are to be laid, they must be accurately cut to size and firmly anchored to the raw surfaces upon which the sheets and strips that form them are laid, to prevent any undesired mutual displacement between strips and sheets as the finishing products are laid thereon, which would generate slits therebetween, in spite of accurate positioning of such products, and create an undesired bridge for the transmission of moisture, noise, and thermal stresses.

Furthermore, a connector element should be provided to connect the surfaces of the foundation strips and sheets together, to ensure that, even when slits are formed, any transmission bridge would be broken.

In order to ensure such surface continuity, segments of adhesive tapes shall be applied, both to firmly hold together the sheets and strips once they have been fixed to the rough surfaces to be covered, and to block any slit formed therebetween.

This prior art suffers from certain drawbacks.

A first drawback is that a time-consuming and laborious work is required to apply the materials that are used to fix the covering sheets and strips to the rough surfaces, to create the foundations.

A further drawback is that, if the sheets and strips are not laid with the utmost care, a number of slits will be formed, which shall be individually closed by the adhesive tape to prevent the formation of transmission bridges.

In short, long times and laborious steps, requiring the utmost care, are needed to prepare and lay prior art foundations, to prevent drawbacks occurring after surface finishing.

OBJECTS OF THE INVENTION

One object of the invention is to improve the state of the art.

Another object of the invention is to provide a surface covering foundation that can be practically laid, has a simple and inexpensive structure and requires no individual application of adhesive tapes to ensure continuity of the cover and prevent the formation of transmission bridges.

In one aspect the invention relates to a holder and dispenser for roll-up products as defined in the features described hereinafter.

Therefore, the invention affords the following advantages:

creating a foundation that is stable and seamless throughout its surface, and preventing the formation of bridges for moisture, noise, thermal agents;

greatly simplifying the foundation laying process, i.e. reducing laying times and allowing the process to be carried out by unskilled operators;

allowing removable laying of finishing products, such as tiles, slabs, slats and the like, made of ceramic, wood or plastic; and improving insulation between the rough surfaces and the finishing products.

BRIEF DESCRIPTION OF DRAWINGS

Further characteristics and advantages will be more apparent from the description of an embodiment of a surface covering foundation, which is illustrated by way of example and without limitation in the annexed drawings, in which:

FIG. 1 is a broken-away perspective view of two covering elements that form a surface covering foundation of the invention, in a first embodiment;

FIG. 2 is a broken-away perspective bottom view of the covering elements of FIG. 1;

FIG. 3 is a broken-away diagrammatic cross-sectional view of two covering elements that form a covering foundation of the invention, in a second embodiment;

FIG. 4 is a broken-away diagrammatic cross-sectional view of two covering elements that form a covering foundation of the invention, in a third embodiment.

DETAILED DESCRIPTION OF A PREFERRED EMBODIMENT

Referring to FIG. 1, numeral 1 designates a first covering element and numeral 2 designates a second covering element, that form a surface covering foundation of the invention.

As shown in FIG. 1, both covering elements 1 and 2 have a substantially flat shape and respective equal thicknesses "S1" and "S2".

Each of the two covering elements 1 and 2 defines a juxtaposition side, namely a first juxtaposition side 101 and a second juxtaposition side 102, which are designed to be juxtaposed, preferably in mutual contact, when the first covering element 1 is juxtaposed with the second covering element 2 to form the foundation.

Still referring to FIG. 1, but also to FIGS. 2 and 3, it shall be noted that the first covering element 1 has an extension lip 3 extending from the first juxtaposition side 101 throughout the length thereof and, as shown in FIG. 3, is designed to overlap the second covering element 2 at the second juxtaposition side 102 thereof.

As shown in the figures, the lip 3 has a thickness "S3" much smaller than the thicknesses "S1" and "S2": therefore, the lip 3 has a sheet construction as thick as a few hundredths or tenths of a millimeter, and is advantageously flexible.

The lip 3 may be attached to the first covering element 1 in various manners.

For instance, as shown in FIG. 3, it may be joined to the bottom surface thereof by means of a double-sided adhesive tape strip 4 or, as shown in FIG. 4, it may be incorporated in the structure of the first covering element 1 itself.

As used herein, the term "incorporated" shall be intended by the skilled person to designate both the case in which the lip 3 is formed at the same time as the first covering element 1, and that in which it is attached thereto later, possibly by heat sealing.

The second covering element 2 accordingly has an area next to the second juxtaposition side 102 that has a glue material strip 5 for bonding the floating part of the lip 3 when the first covering element 1 and the second covering element 2 are in juxtaposed relation.

In this configuration, it appears that any residual slit between the two juxtaposition sides 101 and 102 is closed by the lip 3 that prevents the formation of a bridge for heat and sound agents and moisture.

As shown in FIG. 3, the top surfaces 201 and 202 of the covering elements 1 and 2 may also have a layer of anchoring material to allow application of finishing materials, such as tiles, slabs, slats, of ceramic or plastic material or wood, and tear-off removal thereof.

For instance, a material that can be used therefor, known under the trademark Velcro®, comprises a layer of plastic material having very small raised hooks, that may be attached to the surfaces 201 and 202, and a corresponding layer of filamentous material, that may be attached to the bottom surfaces of the finishing materials, and is adapted to be coupled with the layer 6 in a non-permanent manner.

Both the first covering element 1 and the second covering element 2 may have additional strips 7 of adhesive material on respective bottom surfaces 301 and 302 opposite to the top surfaces 201 and 202, for bonding with the surfaces to be covered by the foundation of the invention, to hold all the covering elements that form the latter still when they are laid thereon.

The structure of the foundation of the invention is compatible with various laying processes.

For instance, a laying process may consist in successively laying the first covering element 1 and the second on a surface to be covered, with the lip 3 overlapping the second element.

The skilled person will understand that additional first covering elements and second covering elements may be added in mutually juxtaposed relation, until the entire surface for which they are designed is covered.

Alternatively, first covering elements and second covering elements may be assembled together beforehand, and joined by respective lips 3, and the overall foundation so obtained may be later laid on the surface to be covered, as if it were a large carpet, and peripherally cut to the size of the surface to be covered.

The above disclosed invention was found to fulfill the intended objects.

The invention is susceptible to a number of changes and variants within the inventive concept.

Furthermore, all the details may be replaced by other technically equivalent parts.

In practice, any materials, shapes and sizes may be used as needed, without departure from the scope of the following claims.

The invention claimed is:

1. A surface covering foundation comprising:
   a first covering element (1) having a thickness (S1) and defining a first approaching side (101); and
   a second covering element (2) having a thickness (S2) substantially the same as the thickness (S1) of said first covering element (1) and defining a second approaching side (102) approachable to said first side (101);
   wherein said first covering element (1) comprises a lip (3) protruding outwardly in extension of said first approaching side (101) and configured to be superimposed to said second approaching side (102) in a approached configuration of said first and second covering elements (1, 2), said lip (3) being fixedly or removably coupled to said first covering element (1),
   wherein said first and second covering elements (1, 2) comprise at least a contact surface (301, 302) with a surface to be covered and an opposite surface (201, 202) designed to receive and support finishing handmade articles,
   wherein said opposite surface (201, 202) comprises a fasten-removable element (6) of said finishing handmade articles, and
   wherein said lip comprises a flexible laminar lip (3) having a thickness (S3) between 0.01 and 1 millimeters.

2. The surface covering foundation according to claim 1, wherein said second approaching side (102) comprises an adhesive element (5) for adhering of said lip (3) when in a superimposed configuration.

3. The surface covering foundation according to claim 1, wherein said lip (3) has a thickness (S3) less than the thickness (S1, S2) of said first and second covering elements (1, 2).

4. A surface covered by a surfaces covering foundation, comprising:
   a surface covering foundation according to claim 1.

* * * * *